Figure 1:
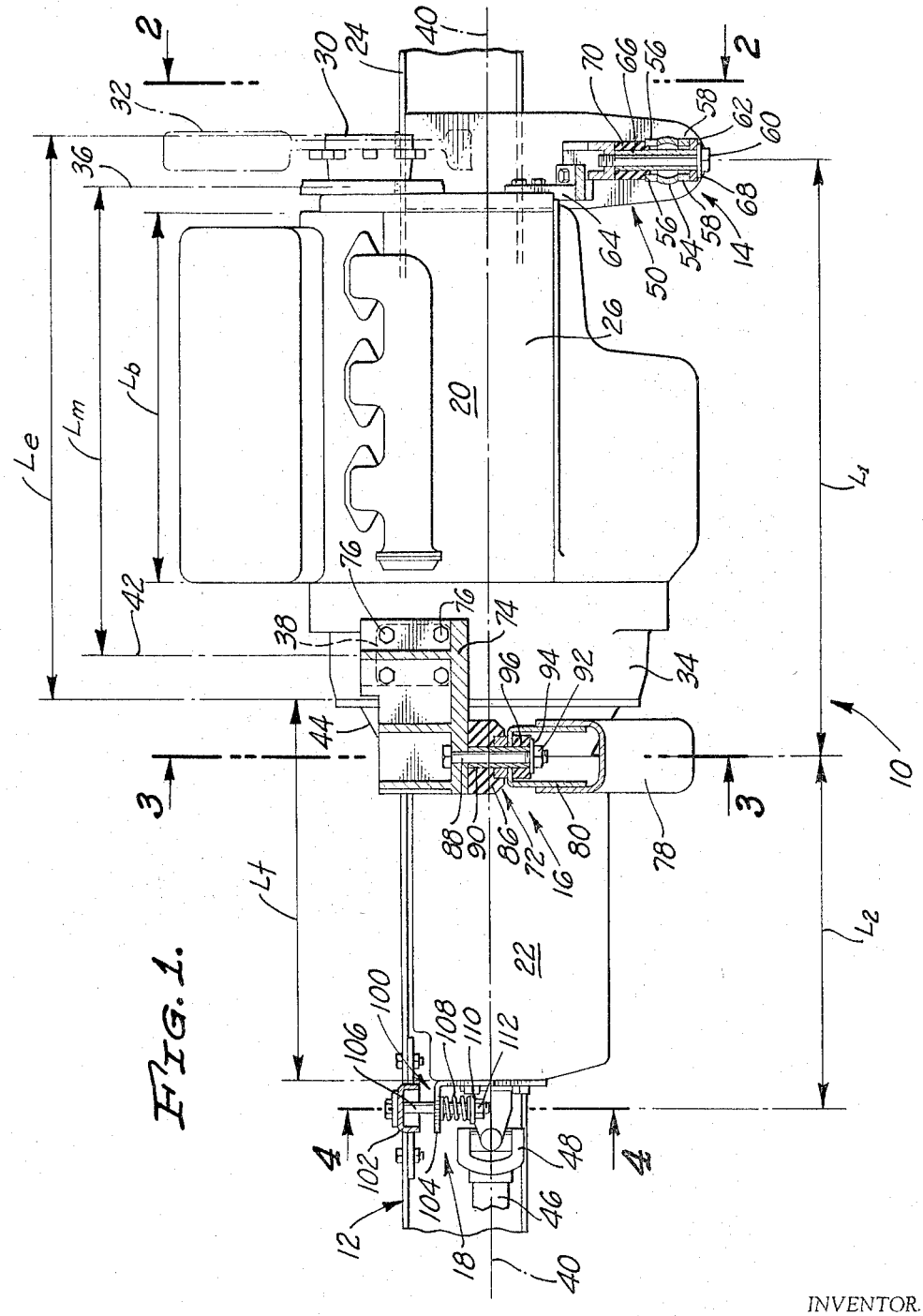

Dec. 6, 1966  K. F. FERGUSON  3,289,781
ENGINE MOUNTING SYSTEM
Filed April 9, 1964  2 Sheets-Sheet 1

INVENTOR.
KENNETH F. FERGUSON
BY HIS ATTORNEYS
HARRIS, KIECH, RUSSELL & KERN

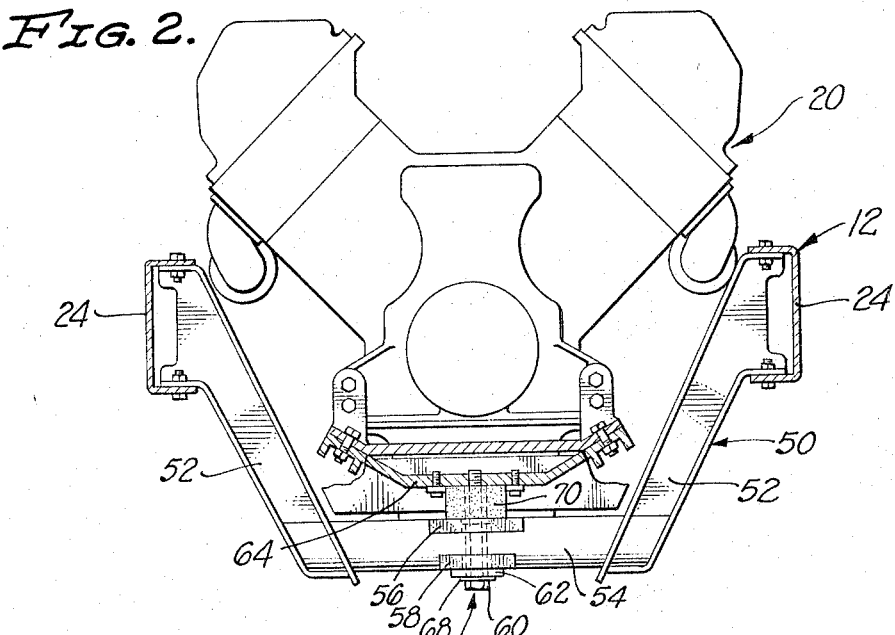
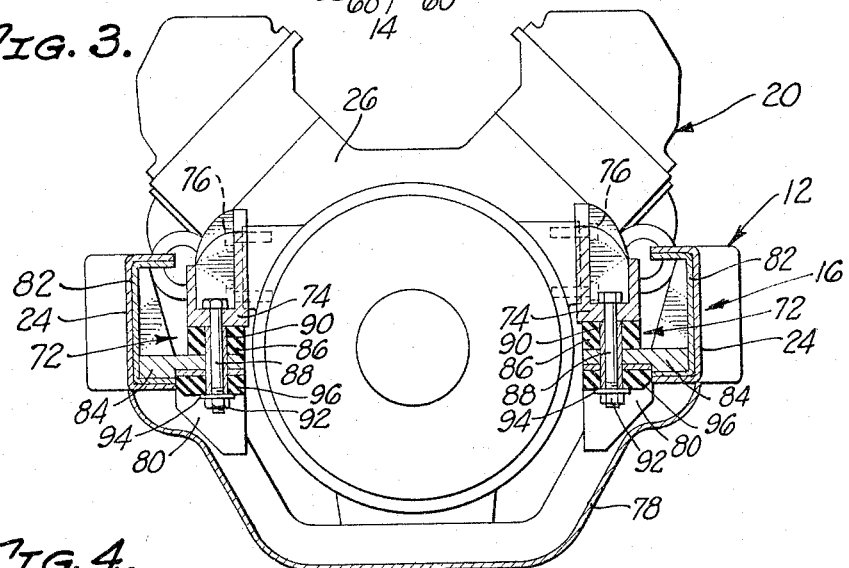

United States Patent Office 3,289,781
Patented Dec. 6, 1966

3,289,781
ENGINE MOUNTING SYSTEM
Kenneth F. Ferguson, Placentia, Calif., assignor to Hunt Foods and Industries, Inc., Fullerton, Calif., a corporation of Delaware
Filed Apr. 9, 1964, Ser. No. 358,467
15 Claims. (Cl. 180—64)

The present invention relates in general to mounting systems for internal combustion engines of the reciprocating type and, more particularly, to means for mounting clutch-coupled engine and transmission assemblies in motor vehicles, such as trucks.

Still more particularly, the invention relates to, and a primary object thereof is to provide, means for mounting a V-type diesel engine and transmission combination in a truck, or other motor vehicle, in a manner to minimize engine-induced vibration of the vehicle.

Considering the background of the invention, in order to reduce truck operating costs, particularly for urban and short-run interurban operation, I substituted a Cummins V6–200 four-cycle diesel engine, manufactured by Cummins Engine Company, Inc., Columbus, Iniana, for the standard or original equipment V–8 gasoline engine of a 1961 Ford C–1000 cab-over-engine tractor, manufactured by Ford Motor Company. To minimize modifications of this truck in converting it to diesel power, I utilized as many of the standard components of the truck as possible, including the transmission and the components of the drive train rearwardly thereof. Thus, I merely mounted the standard transmission for this truck on the diesel engine mentioned, utilizing a suitable clutch to couple the transmission to the engine. Also, I mounted the engine in the truck utilizing the engine-mount locations provided on the engine by its manufacturer.

The foregoing arrangement resulted in extremely severe vibration transmission from the engine to the truck itself, including the cab and components located in and mounted on the cab. The invention successfully reduced the transmitted vibration to an acceptably low level.

Considering the invention more specifically now, a primary object thereof is to mount a V-type diesel engine and transmission assembly in a motor vehicle on resilient mounting means so constructed and located as to maintain engine-induced vibration of the vehicle at acceptably low levels.

More particularly, an important object of the invention is to support the engine and transmission assembly resiliently on front mounting means located adjacent the front end of the engine, on intermediate mounting means located adjacent the rear end of the engine and spaced rearwardly of the front mounting means a distance which is at least of the order of magnitude of the overall length of the engine and which is at least equal to about 1.5 times the length of the block of the engine, and on rear mounting means located adjacent the rear end of the transmission and supporting a weight of the order of the weight of the transmission.

The foregoing construction reduces transmitted vibration in two important ways. First, making the spacing of the front and intermediate mounting means at least of the order of the overall length of the engine provides a stable support for the engine which tends to minimize vibration transmission to the frame of the vehicle, a result which is not achieved with a spacing materially less than the overall length of the engine, or materially less than about 1.5 times the block length. Second, supporting a weight of the order of the weight of the transmission on the resilient rear mounting means adjacent the rear end of the transmission apparently causes the engine and transmission assembly to be supported as an integral unit to further minimize transmitted vibration.

Attaining the necessary longitudinal spacing of the front and intermediate resilient mounting means necessitated locating the intermediate mounting means a substantial distance rearwardly of the rear engine mount locations provided by the engine manufacturer and, in fact, rearwardly of the rear end of the engine itself. An important object of the invention in this connection is to provide resilient intermediate mounting means for the engine-transmission assembly, i.e., resiliently rear mounting means for the engine, located rearwardly of the rear engine mount locations on the engine the required distance, but connected to the engine at such rear engine mount locations.

A further object of the invention is to provide front and intermediate mounting means which include elastomeric mounting elements, an important object in this connection being to provide the intermediate mounting means with elastomeric mounting elements resisting both upward and downward movement of the engine-transmission assembly.

An additional object is to provide a mounting system wherein the resilient front mounting means includes an elastomeric front mount connecting the engine-transmission assembly to the frame at a point adjacent the front end of the engine, the resilient intermediate mounting means includes two elastomeric intermediate mounts respectively connecting the assembly to the frame at points disposed on opposite sides of the assembly and rearwardly of the rear end of the engine, and the resilient rear mounting means includes two spring rear mounts respectively connecting the assembly to the frame at points disposed on opposite sides of the assembly and adjacent the rear end of the transmission, the rear mounts respectively comprising coil springs acting in compression to support a total weight of the order of the weight of the transmission.

The foregoing objects, advantages, features and results of the present invention, together with various other objects, advantages, features and results thereof which will be evident to those skilled in the art to which the invention relates in the light of this disclosure, may be attained with the exemplary embodiment of the invention described in detail hereinafter and illustrated in the accompanying drawings, in which:

FIG. 1 is a side elevational view of a V–6 diesel engine and transmission combination mounted on a motor vehicle frame in accordance with the invention; and FIGS. 2, 3 and 4 are transverse sectional views respectively taken along the arrowed lines 2—2, 3—3 and 4—4 of FIG. 1 of the drawings.

Referring now to the drawings, the numeral 10 designates an engine-transmission assembly mounted on a motor vehicle frame 12 by resilient front, intermediate and rear mounting means 14, 16 and 18 of the invention, the engine-transmission assembly 10 including an engine 20 and a transmission 22. Typically, the frame 12 and the transmission 22 may constitute the frame and the transmission, respectively, of the 1961 Ford C–1000 tractor discussed previously, and the engine 20 may constitute the aforementioned Cummins V6–200 diesel engine.

The frame 12 includes two variably-spaced channels 24 which face each other and the engine-transmission assembly 10 is supported between such channels by the mounting means 14, 16 and 18 of the invention in a manner to be described hereinafter.

The engine 20 includes a V-shaped block 26 the length of which is designated by the dimensional arrow $L_b$. At the front end of the engine 20 is a forwardly-projecting cooling-fan hub 30 (shown in FIG. 1 only) carrying suction fan blades 32 adapted to pull air rearwardly through a radiator, not shown, ahead of the engine. At the rear end of the engine 20, and connected to the rear end of the block 26, is a flywheel housing 34. The overall length of the engine 20 is regarded as the distance between the front end of the fan hub 30 and rear end of the flywheel housing 34, and is designated by the dimensional arrow $L_e$.

Considering specifically the Cummins V–6 diesel engine hereinbefore discussed, it is normally provided by the manufacturer with a single front engine mount location below the level of the bottom of the block 26, and rearwardly of the front end of the engine at substantially the longitudinal position indicated by the reference line 36. The engine is also normally provided by its manufacturer with two rear engine mount locations 38 on opposite sides, respectively, of the flywheel housing 34 above the longitudinal axis 40 of the engine-transmission assembly 10, this axis coinciding with the crankshaft axis of the engine. The normal rear engine mount locations 38 are forward of the rear end of the engine 20 a substantial distance, the longitudinal center of these locations being designated by the reference line 42. The longitudinal spacing of the normal front and rear engine mount locations is represented by the distance between the reference lines 36 and 42, as designated by the dimensional arrow $L_m$.

The transmission 22 includes at its front end the usual bell 44 bolted, or otherwise secured, to the rear end of the flywheel housing 34 and containing a suitable clutch, not shown, for coupling the engine 20 to the transmission. The overall length of the transmission 22, measured from the front end of the bell 44 to the rear end of the transmission case, is designated by the dimensional arrow $L_t$. The transmission 22, which is preferably the standard transmission of the motor vehicle, is connected to the propeller shaft 46 of the motor vehicle by the usual universal joint 48.

The foregoing description of the motor vehicle frame 12, the engine 20 and the transmission 22 will be sufficient for the purposes of this disclosure of the invention. The structures and locations of the mounting means 14, 16 and 18 of the invention will now be considered.

Referring to FIGS. 1 and 2 of the drawings, spanning the space between the frame channels 24, and dropping downwardly under the engine 20 slightly rearwardly of the front end of the fan hub 30, but forwardly of the block 26, is a cradle 50, shown as comprising two downwardly-converging supporting arms 52 interconnected at their lower ends by a tube 54. The laterally central portion of this tube is provided with upper and lower cutouts having upper and lower seating elements 56 and 58 welded thereinto. A mounting bolt 60, carrying a washer 62 seated against the lower seating elements 58, extends upwardly through the laterally-central opening provided by the aforementioned cutouts, and is threaded at its upper end into a mounting bracket 64 suitably bolted to the engine 20. Telescoped over the bolt 60 is a tube 66 the upper end of which is seated against the lower surface of the mounting bracket 64, and the lower end of which is seated against a washer 68 engaging the head of the bolt. Encompassing the tube 66, and interposed between the upper seating elements 56 on the tube 54 and the lower surface of the mounting bracket 64, is an elastomeric block 70 which acts in compression to support the front end of the engine-transmission assembly 10.

The foregoing structure constitutes the resilient front mounting means 14, the longitudinal center of which is located a substantial distance ahead of the front end of the block 20, but slightly rearwardly of the front end of the fan hub 30. It will also be noted that the longitudinal center of the front mounting means 14 is ahead of the normal front mount location 36 provided by the manufacturer of the engine 20. The elastomeric front mount represented by the elastomeric block 70 is located below the longitudinal axis 40 of the engine-transmission assembly 10 a substantial distance.

Turning to a consideration of the resilient intermediate mounting means 16, it includes two elastomeric intermediate mounts 72 respectively disposed on opposite sides of the engine 20 with their longitudinal centers located rearwardly of the rear end of the engine and spaced rearwardly of the longitudinal center of the elastomeric front mount a distance indicated by the dimensional arrow $L_1$, to be discussed hereinafter. The two elastomeric intermediate mounts 72 are identical, except that they are mirror images of each other.

Each intermediate mount includes a bracket 74 which is secured to the engine 20 at the normal rear-engine-mount location 38 provided by the manufacturer, as by screws 76. The brackets 74 extend longitudinally from the locations 38 rearwardly of the rear end of the engine 20.

Interconnecting the frame channels 24, and extending under the transmission 22, is a cradle 78 having downwardly-facing U-shaped clips 80 rigidly connected thereto below the rearward ends of the brackets 74. Welded or otherwise rigidly secured within the frame channels 24 opposite the clips 80 are short channel 82 having rigidly connected thereto spacers 84 which overlie the clips 80. Upper elastomeric blocks 86 are disposed between the lower surfaces of the brackets 74 and the upper surfaces of the spacers 84, and act in compression to support part of the weight of the engine-transmission assembly 10 by opposing downward movement thereof.

Bolts 88 extend downwardly through the brackets 74, the upper elastomeric blocks 86, the spacers 84 and the tops of the clips 80, these bolts having telescoped thereover sleeves 90 which have sliding fits with the spacers 84 and the tops of the clips 80. The bolts 88 are provided at their lower ends with nuts 92 surmounted by washers 94. Interposed between the washers 94 and the bottom surfaces of the tops of the clips 80 are lower elastomeric blocks 96 which act in compression to resist upward movement of the engine-transmission assembly 10.

Thus, the elastomeric intermediate mounts 72 restrain the engine-transmission assembly 10 against both upward and downward movement. I have found that such double restraint is important in minimizing transmitted vibration of the frame 12.

It will be noted that the particular construction shown for the elastomeric intermediate mounts 72 locates the support points provided by the intermediate mounts substantially on the longitudinal axis 40 of the engine-transmission assembly. More particularly, the upper elastomeric blocks 86 lie substantially on the longitudinal axis 40. This is also important from the standpoint of minimizing vibration transmission.

Turning to the resilient rear mounting means 18, this mounting means is located rearwardly of the rear end of the transmission 22 and is located rearwardly of the resilient intermediate mounting means 16 a distance designated by the dimensional arrow $L_2$. The rear mounting means 18, as shown in FIGS. 1 and 4 of the drawings, includes two spring rear mounts 100 respectively disposed rearwardly of and on opposite sides of the transmission 22. The two spring mounts 100 interconnect a cross member 102 between the frame channels 24 and a bracket 104 secured to the rear end of the transmission housing. Each spring mount 100 includes a bolt 106 extending through the cross member 102 and the bracket 104 and encircled by a coil spring 108 acting in compression. Preferably, the coil springs 108 are located below the bracket 104 and have such brackets seated on their upper ends, the lower ends of the springs engaging spring seats 110 carried by nuts 112 threaded on the lower ends of the bolts.

An important feature of the invention is that the nuts 112 on the bolts 106 are so adjusted that the springs 108 support a weight of the order of the weight of the transmission 22 and the clutch coupling it to the engine 20. With the particular engine and transmission combination hereinbefore discussed, the transmission and clutch weight is approximately 440 pounds, and I have found that minimum vibration transmission to the frame 12 is achieved when the spring mounts 100 are so adjusted that each spring 108 supports substantially 220 pounds (under static conditions, of course). The effect of this seems to be to cause the engine 20 and the transmission 22 to act as a more-or-less integral unit supported over a long longitudinal span. In any event, whatever the explanation, the end result is a material reduction in the vibration transmitted to the frame 12.

Considering now some important dimensional relationships of the invention, a key factor in minimizing vibraton transmission to the motor vehicle frame 12 resides in locating the intermediate mounting means 16 rearwardly of the engine 20 to provide a relatively long supporting span, $L_1$, between the front mounting means 14 and the intermediate mounting means. More particularly, I have found that $L_1$ should be at least about 1.5 times the block length, $L_b$, of the engine 20, which, with the particular Cummins engine disclosed, makes $L_1$ at least of the order of magnitude of the overall length, $L_e$, of the engine. With the particular Cummins engine and the particular original-equipment transmission hereinbefore discussed, the preferred range is between about 1.53 and about 1.62 for the ratio of $L_1$ to $L_b$, an actual ratio of 1.58 having provided excellent results.

Since there is a fixed relationship between $L_e$ and $L_b$ with the particular Cummins engine disclosed, it follows from the foregoing that a ratio of $L_1$ to $L_e$ within the range of about 1.00 and 1.06 may be used, an actual ratio of 1.035 having provided excellent results.

The foregoing ratios of 1.58 for $L_1$ to $L_b$ and 1.035 for $L_1$ to $L_e$ correspond to a location for the rear mounting means 16 which is 6.50 inches rearwardly of the normal rear engine mount locations 38.

Viewing the foregoing still differently, the ratio of $L_1$ to $L_m$ (the spacing of the mount locations originally provided by the manufacturer) should be of the order of magnitude of one and one-quarter. This ratio may range between about 1.2 and about 1.3.

The distance $L_2$ need not be any larger than necessary to locate the rear mounting means 18 rearwardly of the transmission 22. Further, $L_2$ may vary with variations in $L_1$ within the ranges hereinbefore discussed.

Specific values for the various dimensions shown in FIG. 1 of the drawings, based on the Cummins engine and Ford tractor combination hereinbefore discussed, are given in the following table:

| | Inches |
|---|---|
| $L_e$ | 35.3 |
| $L_b$ | 23.1 |
| $L_m$ | 29.0 |
| $L_1$ | 36.5 |
| $L_t$ | 25.4 |
| $L_2$ | 22.5 |

The foregoing values for $L_1$ and $L_2$, and particularly the value for $L_1$, provided very satisfactory reductions in vibration transmission to the truck frame, this value for $L_1$ corresponding to the $L_1/L_e$ ratio of 1.035 and the $L_1/L_b$ ratio of 1.58 hereinbefore discussed. This particular $L_1$ value resulted in an $L_1/L_m$ ratio of 1.26.

It will be understood that various changes, modifications and substitutions may be incorporated in the particular embodiment of the invention hereinbefore described and illustrated in the accompanying drawings, without departing from the spirit of the invention as defined by the claims which follow, and in which I claim as my invention:

1. In combination:
   (a) a frame;
   (b) an engine and transmission assembly including an internal combustion engine of the reciprocating type having a block, and including a transmission connected to the rear end of said engine;
   (c) resilient front mounting means connecting said assembly to said frame adjacent the front end of said engine;
   (d) resilient intermediate mounting means connecting said assembly to said frame adjacent the rear end of said engine;
   (e) the spacing of said front and intermediate mounting means being at least about 1.5 times the length of said block; and
   (f) resilient rear mounting means connecting said assembly to said frame adjacent the rear end of said transmission.

2. In combination:
   (a) a frame;
   (b) an engine and transmission assembly including an internal combustion engine of the reciprocating type and including a transmission connected to the rear end of said engine;
   (c) resilient front mounting means connecting said assembly to said frame adjacent the front end of said engine;
   (d) resilient intermediate mounting means connecting said assembly to said frame adjacent the rear end of said engine;
   (e) the spacing of said front and intermediate mounting means being at least of the order of the overall length of said engine; and
   (f) resilient rear mounting means connecting said assembly to said frame adjacent the rear end of said transmission and supporting a weight of the order of the weight of said transmission.

3. In combination:
   (a) a frame;
   (b) an engine and transmission assembly including an internal combustion engine of the reciprocating type having a block, and including a transmission connected to the rear end of said engine;
   (c) resilient front mounting means connecting said assembly to said frame adjacent the front end of said engine;
   (d) resilient intermediate mounting means connecting said assembly to said frame adjacent the rear end of said engine;
   (e) the spacing of said front and intermediate mounting means being at least about 1.5 times the length of said block; and
   (f) resilient rear mounting means connecting said assembly to said frame adjacent the rear end of said transmission and supporting a weight of the order of the weight of said transmission.

4. In combination:
   (a) a frame;
   (b) an engine and transmission assembly including an internal combustion engine of the reciprocating type having a block, and including a transmission connected to the rear end of said engine;
   (c) resilient front mounting means connecting said assembly to said frame adjacent the front end of said engine;
   (d) resilient intermediate mounting means connecting said assembly to said frame rearwardly of the rear end of said engine;
   (e) the spacing of said front and intermediate mounting means being at least of the order of the overall length of said engine and being at least 1.5 times the length of said block; and
   (f) resilient rear mounting means connecting said assembly to said frame rearwardly of the rear end of said transmission and supporting a weight of the order of the weight of said transmission.

5. In combination:
   (a) a frame;
   (b) an engine and transmission assembly having a longitudinal axis and including an internal combustion engine of the reciprocating type and a transmission connected to the rear end of said engine;
(c) resilient front mounting means connecting said assembly to said frame adjacent the front end of said engine and below said axis;
(d) resilient intermediate mounting means connecting said assembly to said frame adjacent the rear end of said engine and adjacent said axis;
(e) the spacing of said front and intermediate mounting means being at least of the order of the overall length of said engine; and
(f) resilient rear mounting means connecting said assembly to said frame adjacent the rear end of said transmission and above said axis and supporting a weight of the order of the weight of said transmission.

6. In combination:
(a) a frame;
(b) an engine transmission assembly including an internal combustion engine of the reciprocating type, and including a transmission connected to the rear end of said engine;
(c) an elastomeric front mount connecting said assembly to said frame at a point adjacent the front end of said engine;
(d) two elastomeric intermediate mounts connecting said assembly to said frame at two points respectively disposed on opposite sides of said assembly and adjacent the rear end of said engine;
(e) the longitudinal spacing of said front and intermediate mounts being at least of the order of the overall length of said engine; and
(f) two spring rear mounts respectively connecting said assembly to said frame at points disposed on opposite sides of said assembly and adjacent the rear end of said transmission, and supporting a weight of the order of the weight of said transmission.

7. In combination:
(a) a frame;
(b) an engine and transmission assembly including an internal combustion engine of the reciprocating type, and including a transmission connected to the rear end of said engine;
(c) an elastomeric front mount connecting said assembly to said frame at a point adjacent the front end of said engine;
(d) two elastomeric intermediate mounts respectively connecting said assembly to said frame at points disposed on opposite sides of said assembly and adjacent the rear end of said engine;
(e) the longitudinal spacing of said front and intermediate mounts being at least of the order of the overall length of said engine;
(f) two spring rear mounts respectively connecting said assembly to said frame at points disposed on opposite sides of said assembly and adjacent the rear end of said transmission, and supporting a weight of the order of the weight of said transmission; and
(g) each of said intermediate mounts including upper and lower elastomeric elements resisting both upward and downward movement of said assembly.

8. In combination:
(a) a frame;
(b) an engine and transmission assembly including an internal combustion engine of the reciprocating type, and including a transmission connected to the rear end of said engine;
(c) an elastomeric front mount connecting said assembly to said frame at a point adjacent the front end of said engine;
(d) two elastomeric intermediate mounts respectively connecting said assembly to said frame at points disposed on opposite sides of said assembly and adjacent the rear end of said engine;
(e) the longitudinal spacing of said front and intermediate mounts being at least of the order of the overall length of said engine;
(f) two spring rear mounts respectively connecting said assembly to said frame at points disposed on opposite sides of said assembly and adjacent the rear end of said transmission, and supporting a weight of the order of the weight of said transmission;
(g) each of said intermediate mounts including upper and lower elastomeric elements resisting both upward and downward movement of said assembly; and
(h) each of said rear mounts including a coil spring acting in compression.

9. In combination:
(a) a frame;
(b) an internal combustion engine of the reciprocating type;
(c) a transmission connected to the rear end of said engine;
(d) resilient front engine mounting means connecting said engine to said frame adjacent the front end of said engine;
(e) resilient rear engine mounting means connecting said engine to said frame adjacent the rear end of said engine;
(f) the spacing of said front and rear engine mounting means being at least equal to the overall length of said engine; and
(g) resilient transmission mounting means connecting said transmission to said frame adjacent the rear end of said transmission and supporting a weight of the order of the weight of said transmission.

10. In combination:
(a) a frame;
(b) an internal combustion engine of the reciprocating type having a block;
(c) a transmission connected to the rear end of said engine;
(d) resilient front engine mounting means connecting said engine to said frame adjacent the front end of said engine;
(e) resilient rear engine mounting means connecting said engine to said frame adjacent the rear end of said engine;
(f) the spacing of said front and rear engine mounting means being at least about 1.5 times the length of said block; and
(g) resilient transmission mounting means connecting said transmission to said frame adjacent the rear end of said transmission and supporting a weight of the order of the weight of said transmission.

11. In combination:
(a) a frame;
(b) an internal combustion engine of the reciprocating type;
(c) a transmission connected to the rear end of said engine;
(d) resilient front engine mounting means connecting said engine to said frame adjacent the front end of said engine;
(e) resilient rear engine mounting means connecting said engine to said frame rearwardly of the rear end of said engine;
(f) the spacing of said front and rear engine mounting means being at least equal to the overall length of said engine, but not more than 1.06 times such overall length; and
(g) resilient transmission mounting means connecting said transmission to said frame adjacent the rear end of said transmission and supporting a weight of the order of the weight of said transmission.

12. In combination:
(a) a frame;
(b) a V-6, four-cycle, diesel engine including a block and having front and rear ends;

(c) a transmission connected to the rear end of said engine;
(d) resilient front engine mounting means connecting said engine to said frame adjacent the front end of said engine;
(e) resilient rear engine mounting means connecting said engine to said frame adjacent the rear end of said engine;
(f) the spacing of said front and rear engine mounting means being between about 1.00 and about 1.06 times the overall length of said engine, and being between about 1.53 and about 1.62 times the length of said block; and
(g) resilient transmission mounting means connecting said transmission to said frame adjacent the rear end of said transmission and supporting at least a part of the weight of said transmission.

13. In combination:
(a) a frame;
(b) a V-6, four-cycle, diesel engine including a block and having front and rear ends;
(c) a transmission connected to the rear end of said engine;
(d) resilient front engine mounting means connecting said engine to said frame adjacent the front end of said engine;
(e) resilient rear engine mounting means connecting said engine to said frame rearwardly of the rear end of said engine;
(f) the spacing of said front and rear engine mounting means being between about 1.00 and about 1.06 times the overall length of said engine, and being between about 1.53 and about 1.62 times the length of said block; and
(g) resilient transmission mounting means connecting said transmission to said frame adjacent the rear end of said transmission and supporting a weight of the order of the weight of said transmission.

14. In combination:
(a) a frame;
(b) an engine and transmission assembly including a V-6, four-cycle, diesel engine having front and rear mounting points, and including a transmission connected to the rear end of said engine;
(c) resilient front mounting means connecting said assembly to said frame adjacent the front end of said engine;
(d) resilient intermediate mounting means connecting said assembly to said frame adjacent the rear end of said engine;
(e) the spacing of said front and intermediate mounting means being of the order of one and one-quarter times the spacing of said mounting points; and
(f) resilient rear mounting means connecting said assembly to said frame adjacent the rear end of said transmission.

15. In combination:
(a) a frame;
(b) an engine and transmission assembly including a V-6, four-cycle, diesel engine having front and rear mounting points, and including a transmission connected to the rear end of said engine;
(c) resilient front mounting means connecting said assembly to said frame adjacent the front end of said engine;
(d) resilient intermediate mounting means connecting said assembly to said frame adjacent the rear end of said engine;
(e) the spacing of said front and intermediate mounting means being of the order of one and one-quarter times the spacing of said mounting points; and
(f) resilient rear mounting means connecting said assembly to said frame adjacent the rear end of said transmission and supporting a weight of the order of the weight of said transmission.

References Cited by the Examiner

UNITED STATES PATENTS

| | | | |
|---|---|---|---|
| 1,613,683 | 1/1927 | Utz | 180—64 X |
| 2,155,750 | 4/1939 | Best. | |
| 2,864,573 | 12/1958 | Olley et al. | |

FOREIGN PATENTS 641,310   1/1937   Germany.

BENJAMIN HERSH, *Primary Examiner.*

MILTON L. SMITH, *Examiner.*